(12) United States Patent
White et al.

(10) Patent No.: US 10,373,409 B2
(45) Date of Patent: Aug. 6, 2019

(54) IDENTIFICATION SCAN IN COMPLIANCE WITH JURISDICTIONAL OR OTHER RULES

(71) Applicant: Intellicheck, Inc., Jericho, NY (US)

(72) Inventors: Billy Joe White, Lynnwood, WA (US); Russell T. Embry, New York, NY (US)

(73) Assignee: Intellicheck, Inc., Melville, NY (US)

( * ) Notice: Subject to any disclaimer, the term of this patent is extended or adjusted under 35 U.S.C. 154(b) by 130 days.

(21) Appl. No.: 14/530,568

(22) Filed: Oct. 31, 2014

(65) Prior Publication Data

US 2016/0125680 A1 May 5, 2016

(51) Int. Cl.
| | |
|---|---|
| G06K 7/00 | (2006.01) |
| G06K 7/10 | (2006.01) |
| G06K 9/00 | (2006.01) |
| G07C 9/00 | (2006.01) |

(52) U.S. Cl.
CPC ........... *G07C 9/00103* (2013.01); *G06K 7/00* (2013.01); *G06K 7/10415* (2013.01); *G06K 9/00* (2013.01); *G07C 9/00007* (2013.01)

(58) Field of Classification Search
CPC .. G07C 9/00; G07C 9/00103; G07C 9/00007; G06K 7/00; G06K 7/10415
See application file for complete search history.

(56) References Cited

U.S. PATENT DOCUMENTS

| | | | |
|---|---|---|---|
| 3,569,619 A | 3/1971 | Simjian et al. | |
| 3,636,318 A | 1/1972 | Lindstrom et al. | |
| 3,702,392 A | 11/1972 | St. Jean | |
| 3,868,057 A | 2/1975 | Chavez | |
| 3,906,201 A | 9/1975 | Housman et al. | |
| 3,956,615 A | 5/1976 | Anderson et al. | |

(Continued)

FOREIGN PATENT DOCUMENTS

| | | |
|---|---|---|
| DE | 2802430 A1 | 7/1978 |
| DE | 3050473 C2 | 9/1986 |

(Continued)

OTHER PUBLICATIONS

"Natural Language Understanding Through Fuzzy Logic Interference and Its Application to Speech Recognition" (2002) Jiping Sun, Fakhri Karray, Otman Basir & Mohamed Kamel.

(Continued)

*Primary Examiner* — Daniel I Walsh
(74) *Attorney, Agent, or Firm* — Ruttler Mills, PLLC; James J. Ruttler

(57) ABSTRACT

Methods and systems for displaying information derived from identification documents associated with individuals are disclosed. In some embodiments, the system first scans or retrieves identification information from an identification document. The system then receives information of an issuer of the identification document, information of a current location of the identification document, and information of a proposed use of the identification information. The system then receives a set of rules from a database based on the information of the issuer, the current location, and the proposed use. Based on the set of rules, the system processes the retrieved identification information so as to form redacted or processed identification information. The system then displays the redacted identification information.

31 Claims, 6 Drawing Sheets

(56) References Cited

U.S. PATENT DOCUMENTS

| | | |
|---|---|---|
| 3,988,570 A | 10/1976 | Murphy et al. |
| 4,138,057 A | 2/1979 | Atalla |
| 4,180,207 A | 12/1979 | Lee |
| 4,186,871 A | 2/1980 | Anderson et al. |
| 4,193,131 A | 3/1980 | Lennon et al. |
| RE30,579 E | 4/1981 | Goldman et al. |
| 4,304,961 A | 12/1981 | Campbell, Jr. |
| 4,357,529 A | 11/1982 | Atalla |
| 4,369,361 A | 1/1983 | Swartz et al. |
| 4,450,348 A | 5/1984 | Stockburger et al. |
| 4,453,074 A | 6/1984 | Weinstein |
| 4,471,216 A | 9/1984 | Herve |
| 4,506,148 A | 3/1985 | Berthold et al. |
| 4,575,816 A | 3/1986 | Hendrickson et al. |
| 4,629,872 A | 12/1986 | Hallberg |
| 4,634,846 A | 1/1987 | Harvey et al. |
| 4,639,889 A | 1/1987 | Matsumoto et al. |
| 4,656,473 A | 4/1987 | Goldman et al. |
| 4,659,914 A | 4/1987 | Kondo et al. |
| 4,689,477 A | 8/1987 | Goldman |
| 4,752,676 A | 6/1988 | Leonard et al. |
| 4,807,287 A | 2/1989 | Tucker et al. |
| 4,811,393 A | 3/1989 | Hazard |
| 4,811,408 A | 3/1989 | Goldman |
| 4,812,628 A | 3/1989 | Boston et al. |
| 4,816,655 A | 3/1989 | Musyck et al. |
| 4,816,657 A | 3/1989 | Stockburger et al. |
| 4,879,747 A | 11/1989 | Leighton |
| 4,906,988 A | 3/1990 | Copella |
| 4,972,476 A | 11/1990 | Nathans |
| 4,981,370 A | 1/1991 | Dziewit et al. |
| 4,982,072 A | 1/1991 | Takigami |
| 4,993,068 A | 2/1991 | Piosenka et al. |
| 4,995,081 A | 2/1991 | Leighton et al. |
| 5,001,752 A | 3/1991 | Fischer |
| 5,007,089 A | 4/1991 | Matyas et al. |
| 5,012,077 A | 4/1991 | Takano |
| 5,016,192 A | 5/1991 | Ishido et al. |
| 5,030,117 A | 7/1991 | Delorme |
| 5,054,077 A | 10/1991 | Suzuki |
| 5,055,658 A | 10/1991 | Cockburn |
| 5,136,643 A | 8/1992 | Fischer |
| 5,140,634 A | 8/1992 | Guillon et al. |
| 5,163,098 A | 11/1992 | Dabhura |
| 5,172,785 A | 12/1992 | Takahashi |
| 5,199,074 A | 3/1993 | Thor |
| 5,214,699 A | 5/1993 | Monroe et al. |
| 5,222,152 A | 6/1993 | Fishbine et al. |
| 5,237,611 A | 8/1993 | Rasmussen et al. |
| 5,241,600 A | 8/1993 | Hillis |
| 5,249,227 A | 9/1993 | Bergum et al. |
| 5,259,025 A | 11/1993 | Monroe et al. |
| 5,267,315 A | 11/1993 | Narita et al. |
| 5,280,527 A | 1/1994 | Gullman et al. |
| 5,284,364 A | 2/1994 | Jain |
| 5,287,181 A | 2/1994 | Holman |
| 5,321,751 A | 6/1994 | Ray et al. |
| 5,336,871 A | 8/1994 | Colgate, Jr. |
| 5,337,358 A | 8/1994 | Axelrod |
| 5,337,361 A | 8/1994 | Wang et al. |
| 5,341,428 A | 8/1994 | Schatz |
| 5,347,589 A | 9/1994 | Meeks et al. |
| 5,367,148 A | 11/1994 | Storch et al. |
| 5,367,581 A | 11/1994 | Abel |
| 5,420,924 A | 5/1995 | Berson et al. |
| 5,422,468 A | 6/1995 | Abecassis |
| 5,429,361 A | 7/1995 | Raven et al. |
| 5,432,864 A | 7/1995 | Lu et al. |
| 5,446,273 A | 8/1995 | Leslie |
| 5,446,885 A | 8/1995 | Moore et al. |
| 5,453,600 A | 9/1995 | Swartz |
| 5,461,217 A | 10/1995 | Claus |
| 5,469,506 A | 11/1995 | Berson et al. |
| 5,471,533 A | 11/1995 | Wang et al. |
| 5,475,585 A | 12/1995 | Bush |
| 5,490,217 A | 2/1996 | Wang et al. |
| 5,500,518 A | 3/1996 | Olzak et al. |
| 5,506,395 A | 4/1996 | Eppley |
| 5,513,019 A | 4/1996 | Cueli |
| 5,513,261 A | 4/1996 | Maher |
| 5,513,272 A | 4/1996 | Bogosian, Jr. |
| 5,514,860 A | 5/1996 | Berson |
| 5,546,278 A | 8/1996 | Bethurum |
| 5,553,143 A | 9/1996 | Ross |
| 5,559,885 A | 9/1996 | Drexler et al. |
| 5,590,193 A | 12/1996 | Le Roux |
| 5,594,226 A | 1/1997 | Steger |
| 5,594,806 A | 1/1997 | Colbert |
| 5,598,474 A | 1/1997 | Johnson |
| 5,610,993 A | 3/1997 | Yamamoto |
| 5,621,200 A | 4/1997 | Irwin, Jr. et al. |
| 5,630,127 A | 5/1997 | Moore et al. |
| 5,635,981 A | 6/1997 | Ribacoff |
| 5,642,485 A | 6/1997 | Deaton |
| 5,651,066 A | 7/1997 | Moriyasu et al. |
| 5,661,805 A | 8/1997 | Miyauchi |
| 5,663,553 A | 9/1997 | Aucsmith |
| 5,668,874 A | 9/1997 | Kristol et al. |
| 5,679,940 A | 10/1997 | Templeton et al. |
| 5,694,471 A | 12/1997 | Chen et al. |
| 5,695,835 A | 12/1997 | Weber et al. |
| 5,706,507 A | 1/1998 | Schloss |
| 5,712,472 A | 1/1998 | Lee |
| 5,717,776 A | 2/1998 | Watanabe |
| 5,719,939 A | 2/1998 | Tel |
| 5,721,777 A | 2/1998 | Blaze |
| 5,722,526 A | 3/1998 | Sharrard |
| 5,742,685 A | 4/1998 | Berson et al. |
| D393,950 S | 5/1998 | Lockhart |
| 5,748,908 A | 5/1998 | Yu |
| 5,754,939 A | 5/1998 | Herz et al. |
| 5,770,084 A | 6/1998 | Novis et al. |
| 5,770,849 A | 6/1998 | Novis et al. |
| 5,781,650 A | 7/1998 | Lobo et al. |
| 5,786,587 A | 7/1998 | Colgate, Jr. |
| 5,805,849 A | 9/1998 | Jordan et al. |
| 5,812,664 A | 9/1998 | Bernobich et al. |
| 5,838,812 A | 11/1998 | Pare et al. |
| 5,848,426 A | 12/1998 | Wang et al. |
| 5,862,247 A | 1/1999 | Fisun et al. |
| 5,864,622 A | 1/1999 | Marcus |
| 5,864,623 A * | 1/1999 | Messina .................. G07F 7/08 235/380 |
| 5,870,723 A | 2/1999 | Pare, Jr. et al. |
| 5,966,654 A | 10/1999 | Croughwell et al. |
| 5,988,497 A | 11/1999 | Wallace |
| 5,991,429 A | 11/1999 | Coffin et al. |
| 5,995,014 A | 11/1999 | DiMaria |
| 6,038,666 A | 3/2000 | Hsu et al. |
| 6,070,147 A | 5/2000 | Harms et al. |
| 6,075,455 A | 6/2000 | DiMaria et al. |
| 6,089,452 A | 7/2000 | Rhode, III |
| 6,104,809 A | 8/2000 | Berson et al. |
| 6,119,932 A | 9/2000 | Maloney et al. |
| 6,119,933 A | 9/2000 | Wong et al. |
| 6,135,355 A | 10/2000 | Han et al. |
| 6,138,914 A | 10/2000 | Campo et al. |
| 6,148,091 A | 11/2000 | DiMaria |
| 6,169,542 B1 | 1/2001 | Hooks et al. |
| 6,171,138 B1 | 1/2001 | Lefebvre et al. |
| 6,182,221 B1 | 1/2001 | Hsu et al. |
| 6,196,460 B1 | 3/2001 | Shin |
| 6,199,079 B1 | 3/2001 | Gupta et al. |
| 6,202,055 B1 | 3/2001 | Houvener et al. |
| 6,222,463 B1 | 4/2001 | Rai |
| 6,224,109 B1 | 5/2001 | Yang |
| 6,234,389 B1 | 5/2001 | Valliani et al. |
| 6,263,447 B1 | 7/2001 | French et al. |
| 6,279,013 B1 * | 8/2001 | LaMarca ................. G06Q 30/02 379/100.07 |
| 6,289,113 B1 | 9/2001 | McHugh et al. |
| 6,317,544 B1 | 11/2001 | Diehl et al. |
| 6,354,506 B1 | 3/2002 | Plan et al. |
| 6,363,387 B1 | 3/2002 | Ponnekanti et al. |

(56) References Cited

U.S. PATENT DOCUMENTS

| | | |
|---|---|---|
| 6,386,451 B1 | 5/2002 | Sehr |
| 6,442,532 B1 | 8/2002 | Kawan |
| 6,460,185 B1 | 10/2002 | Hardy |
| 6,463,416 B1 | 10/2002 | Messina |
| 6,475,146 B1 | 11/2002 | Frelburger et al. |
| 6,484,260 B1 | 11/2002 | Scott et al. |
| 6,499,141 B1 | 12/2002 | Egnew |
| 6,523,741 B1 | 2/2003 | DiMaria et al. |
| 6,542,635 B1 | 4/2003 | Hu et al. |
| 6,557,752 B1 | 5/2003 | Yacoob |
| 6,564,997 B1 | 5/2003 | Juds |
| 6,565,000 B2 | 5/2003 | Sehr |
| 6,587,032 B2 | 7/2003 | Armingaud |
| 6,592,029 B2 | 7/2003 | Brikho |
| 6,609,659 B2 | 8/2003 | Sehr |
| 6,612,958 B2 | 9/2003 | Imai et al. |
| 6,615,263 B2 | 9/2003 | Dulai et al. |
| 6,624,739 B1 | 9/2003 | Stobbe |
| 6,651,217 B1 | 11/2003 | Kennedy et al. |
| 6,679,425 B1 | 1/2004 | Sheppard et al. |
| 6,736,317 B1 | 5/2004 | McDonald et al. |
| 6,736,322 B2 | 5/2004 | Gobburu et al. |
| 6,745,937 B2 | 6/2004 | Walsh et al. |
| 6,754,910 B2 | 6/2004 | Shultz et al. |
| 6,758,394 B2 | 7/2004 | Maskatiya et al. |
| 6,760,463 B2 | 7/2004 | Rhoads |
| 6,779,721 B2 | 8/2004 | Larson et al. |
| 6,785,405 B2 | 8/2004 | Tuttle et al. |
| 6,808,109 B2 | 10/2004 | Page |
| 6,820,984 B2 | 11/2004 | Furuhata |
| 6,854,642 B2 | 2/2005 | Metcalf et al. |
| 6,910,223 B2 | 6/2005 | Egnew |
| 6,914,517 B2 | 7/2005 | Kinsella |
| 6,920,437 B2 | 7/2005 | Messina |
| 6,928,546 B1 | 8/2005 | Nanavati et al. |
| 6,934,861 B2 | 8/2005 | Haala |
| 6,944,782 B2 | 9/2005 | von Mueller et al. |
| 6,956,615 B2 | 10/2005 | Nakagishi et al. |
| 6,970,088 B2 | 11/2005 | Kovach |
| 6,991,159 B2 | 1/2006 | Zenou |
| 7,003,669 B2 | 2/2006 | Monk |
| 7,027,931 B1 | 4/2006 | Jones et al. |
| 7,035,626 B1 | 4/2006 | Luciano, Jr. |
| 7,059,516 B2 | 6/2006 | Matsuyama et al. |
| 7,072,081 B2 | 7/2006 | Johnson et al. |
| 7,110,573 B2 | 9/2006 | Monk et al. |
| 7,117,228 B2 | 10/2006 | Tomita et al. |
| 7,118,033 B2 | 10/2006 | Merkert |
| 7,119,553 B2 | 10/2006 | Yang et al. |
| 7,119,674 B2 | 10/2006 | Sefton |
| 7,147,155 B2 | 12/2006 | Weekes |
| 7,161,465 B2 | 1/2007 | Wood et al. |
| 7,185,808 B2 | 3/2007 | Mitsumoto |
| 7,212,113 B2 | 5/2007 | Zanovitch |
| 7,212,279 B1 | 5/2007 | Feng |
| 7,244,043 B2 | 7/2007 | Monk et al. |
| 7,277,891 B2 | 10/2007 | Howard et al. |
| 7,280,030 B1 | 10/2007 | Monaco |
| 7,284,698 B2 | 10/2007 | Sogo |
| 7,299,408 B1 * | 11/2007 | Daconta ............... G06Q 10/10 715/234 |
| 7,309,010 B2 | 12/2007 | Stopperan et al. |
| 7,309,012 B2 | 12/2007 | von Mueller et al. |
| 7,313,825 B2 | 12/2007 | Redlich et al. |
| 7,349,987 B2 | 3/2008 | Redlich et al. |
| 7,362,210 B2 | 4/2008 | Bazakos et al. |
| 7,382,261 B2 | 6/2008 | Lin et al. |
| 7,382,911 B1 | 6/2008 | Meier et al. |
| 7,392,944 B2 | 7/2008 | Shieh |
| 7,466,223 B2 | 12/2008 | Sefton |
| 7,478,067 B2 | 1/2009 | Messina |
| 7,484,088 B2 | 1/2009 | Campbell et al. |
| 7,492,256 B2 | 2/2009 | Eren et al. |
| 7,494,060 B2 | 2/2009 | Zagami |
| 7,500,178 B1 | 3/2009 | O'Donnell |
| 7,526,645 B2 * | 4/2009 | Miyazaki ............... G06F 21/64 713/167 |
| 7,554,446 B2 | 6/2009 | Ciarcia et al. |
| 7,568,108 B2 | 7/2009 | Monaco et al. |
| 7,587,368 B2 | 9/2009 | Felsher |
| 7,599,847 B2 | 10/2009 | Block et al. |
| 7,631,805 B2 | 12/2009 | Larson et al. |
| 7,639,846 B2 | 12/2009 | Yoda |
| 7,685,629 B1 | 3/2010 | White et al. |
| 7,708,189 B1 | 5/2010 | Cipriano |
| 7,716,240 B2 | 5/2010 | Lim |
| 7,739,744 B2 | 6/2010 | Burch et al. |
| 7,802,305 B1 * | 9/2010 | Leeds ................ G06F 17/2735 715/230 |
| 7,817,013 B2 | 10/2010 | Bazakos et al. |
| 7,821,391 B2 | 10/2010 | Gupta et al. |
| 7,844,545 B2 | 11/2010 | Michelsen |
| 7,860,318 B2 | 12/2010 | Mandelbaum et al. |
| 7,895,611 B2 | 2/2011 | Grabarnik et al. |
| 7,898,385 B2 | 3/2011 | Kocher |
| 7,899,751 B2 * | 3/2011 | Messina ................ G06Q 20/20 705/50 |
| 7,925,887 B2 | 4/2011 | Burton |
| 8,009,013 B1 | 8/2011 | Hirschfeld et al. |
| 8,019,691 B2 | 9/2011 | Dominguez et al. |
| 8,023,140 B2 | 9/2011 | Lapstun et al. |
| 8,036,431 B1 | 10/2011 | Fisher et al. |
| 8,083,130 B1 | 12/2011 | Cipriano |
| 8,086,525 B2 | 12/2011 | Atwood et al. |
| 8,090,388 B1 * | 1/2012 | Opitz ..................... G01S 5/02 455/161.2 |
| 8,139,869 B2 | 3/2012 | Mandelbaum et al. |
| 8,220,047 B1 * | 7/2012 | Soghoian ................ H04L 51/14 709/206 |
| 8,235,287 B2 | 8/2012 | McKelvey |
| 8,286,875 B2 | 10/2012 | Tang et al. |
| 8,294,554 B2 | 10/2012 | Shoarinejad et al. |
| 8,322,605 B2 | 12/2012 | Ludlow et al. |
| 8,517,254 B1 | 8/2013 | Cipriano |
| 8,520,957 B2 | 8/2013 | Mandelbaum et al. |
| 8,616,446 B2 | 12/2013 | Ludlow et al. |
| 8,771,085 B1 | 7/2014 | Clyde et al. |
| 8,960,541 B2 | 2/2015 | Ludlow |
| 8,964,211 B2 * | 2/2015 | Koga ........................ 358/1.15 |
| 9,069,982 B2 * | 6/2015 | Coles ................. G06F 21/6209 |
| 9,245,157 B1 | 1/2016 | Cipriano |
| 9,697,667 B1 | 7/2017 | Cipriano |
| 9,864,482 B2 * | 1/2018 | Dube ..................... G06F 21/10 |
| 2001/0027439 A1 | 10/2001 | Holtzman et al. |
| 2001/0034222 A1 | 10/2001 | Roustaei et al. |
| 2001/0041581 A1 | 11/2001 | Hansson |
| 2002/0001393 A1 * | 1/2002 | Jones ................. G06K 9/00979 382/100 |
| 2002/0002507 A1 | 1/2002 | Hatakeyama |
| 2002/0010679 A1 | 1/2002 | Felsher |
| 2002/0025796 A1 | 2/2002 | Taylor et al. |
| 2002/0046185 A1 | 4/2002 | Villart et al. |
| 2002/0052193 A1 | 5/2002 | Chetty |
| 2002/0056747 A1 | 5/2002 | Matsuyama et al. |
| 2002/0087478 A1 | 7/2002 | Hudd et al. |
| 2002/0089410 A1 | 7/2002 | Janiak et al. |
| 2002/0095389 A1 | 7/2002 | Gaines |
| 2002/0100802 A1 | 8/2002 | Sehr |
| 2002/0100803 A1 | 8/2002 | Sehr |
| 2002/0134837 A1 | 9/2002 | Kishon |
| 2002/0143571 A1 | 10/2002 | Messina |
| 2002/0156676 A1 | 10/2002 | Ahrens et al. |
| 2003/0048904 A1 | 3/2003 | Wang et al. |
| 2003/0055689 A1 | 3/2003 | Block et al. |
| 2003/0057276 A1 | 3/2003 | Appalucci et al. |
| 2003/0070077 A1 | 4/2003 | Redlich et al. |
| 2003/0071730 A1 | 4/2003 | Valbh |
| 2003/0078069 A1 | 4/2003 | Lindeman |
| 2003/0099379 A1 | 5/2003 | Monk et al. |
| 2003/0115459 A1 * | 6/2003 | Monk .................... G06Q 50/26 713/168 |
| 2003/0126092 A1 | 7/2003 | Chihara |
| 2003/0143990 A1 | 7/2003 | Minear et al. |

(56) References Cited

U.S. PATENT DOCUMENTS

| | | |
|---|---|---|
| 2003/0154138 A1* | 8/2003 | Phillips .................. G06F 21/31 705/26.1 |
| 2003/0177102 A1* | 9/2003 | Robinson ............... G06Q 20/04 705/75 |
| 2003/0182435 A1 | 9/2003 | Redlich et al. |
| 2003/0218066 A1 | 11/2003 | Fernandes et al. |
| 2003/0225687 A1 | 12/2003 | Lawrence |
| 2004/0002894 A1 | 1/2004 | Kocher |
| 2004/0010472 A1 | 1/2004 | Hilby et al. |
| 2004/0034666 A1 | 2/2004 | Chen |
| 2004/0049401 A1 | 3/2004 | Carr et al. |
| 2004/0059688 A1 | 3/2004 | Dominguez et al. |
| 2004/0068693 A1* | 4/2004 | Rawat ................... G06F 17/243 715/226 |
| 2004/0078335 A1 | 4/2004 | Calvesio et al. |
| 2004/0080504 A1 | 4/2004 | Salesky |
| 2004/0081332 A1 | 4/2004 | Tuttle et al. |
| 2004/0083091 A1 | 4/2004 | Ie et al. |
| 2004/0104268 A1 | 6/2004 | Bailey |
| 2004/0107356 A1* | 6/2004 | Shamoon ............ H04L 63/0428 713/193 |
| 2004/0117060 A1 | 6/2004 | Stopperan et al. |
| 2004/0117624 A1 | 6/2004 | Brandt et al. |
| 2004/0124982 A1 | 7/2004 | Kovach |
| 2004/0153408 A1* | 8/2004 | Jones .................... G06Q 20/042 705/43 |
| 2004/0205466 A1 | 10/2004 | Kuppinger et al. |
| 2004/0215557 A1 | 10/2004 | Michelsen |
| 2004/0223197 A1* | 11/2004 | Ohta .................. G06K 9/00456 358/538 |
| 2004/0233036 A1 | 11/2004 | Sefton |
| 2004/0250142 A1* | 12/2004 | Feyler ................... G06Q 20/341 235/380 |
| 2004/0254895 A1 | 12/2004 | Kumagaya et al. |
| 2005/0039014 A1 | 2/2005 | Sajkowsky |
| 2005/0076013 A1 | 4/2005 | Hilbert |
| 2005/0080649 A1 | 4/2005 | Alvarez et al. |
| 2005/0082365 A1 | 4/2005 | Merkert |
| 2005/0093675 A1 | 5/2005 | Wood et al. |
| 2005/0131829 A1 | 6/2005 | Messina |
| 2005/0137987 A1* | 6/2005 | May ....................... G06Q 20/20 705/75 |
| 2005/0140679 A1* | 6/2005 | Kaneda ................. G06K 9/4647 345/441 |
| 2005/0171787 A1 | 8/2005 | Zagami |
| 2005/0187677 A1 | 8/2005 | Walker |
| 2005/0205668 A1 | 9/2005 | Sogo |
| 2005/0209955 A1 | 9/2005 | Underwood et al. |
| 2005/0212654 A1 | 9/2005 | Yoda |
| 2005/0216953 A1 | 9/2005 | Ellingson |
| 2005/0241003 A1 | 10/2005 | Sweeney et al. |
| 2005/0242172 A1* | 11/2005 | Murata ................... G06Q 20/10 235/380 |
| 2005/0247787 A1 | 11/2005 | Von Mueller et al. |
| 2005/0248450 A1 | 11/2005 | Zanovitch |
| 2005/0258234 A1* | 11/2005 | Silverbrook ......... G06Q 10/087 235/379 |
| 2005/0273453 A1 | 12/2005 | Holloran |
| 2005/0284931 A1 | 12/2005 | Adams et al. |
| 2006/0004812 A1 | 1/2006 | Blackwell et al. |
| 2006/0047731 A1* | 3/2006 | Matsui ................... G06F 16/93 |
| 2006/0049255 A1 | 3/2006 | Mueller et al. |
| 2006/0075228 A1* | 4/2006 | Black et al. .................. 713/167 |
| 2006/0080541 A1 | 4/2006 | Monaco et al. |
| 2006/0102717 A1 | 5/2006 | Wood et al. |
| 2006/0151607 A1* | 7/2006 | Horikiri ............... H04N 1/2179 235/454 |
| 2006/0157559 A1* | 7/2006 | Levy ..................... G06K 17/00 235/380 |
| 2006/0176062 A1 | 8/2006 | Yang et al. |
| 2006/0184575 A1 | 8/2006 | Singleton |
| 2006/0186994 A1 | 8/2006 | Lin et al. |
| 2006/0231610 A1* | 10/2006 | Cheng ......................... 235/380 |
| 2006/0237529 A1 | 10/2006 | Kelley et al. |
| 2006/0243799 A1 | 11/2006 | Kelly et al. |
| 2006/0259983 A1* | 11/2006 | Sperry ................ G06F 21/6245 726/28 |
| 2007/0046424 A1 | 3/2007 | Davis et al. |
| 2007/0069921 A1 | 3/2007 | Sefton |
| 2007/0085684 A1 | 4/2007 | Ciarcia et al. |
| 2007/0094594 A1* | 4/2007 | Matichuk et al. ............ 715/530 |
| 2007/0118479 A1* | 5/2007 | Halsema ............ G06F 21/6245 705/51 |
| 2007/0121937 A1 | 5/2007 | Kochevar et al. |
| 2007/0152841 A1 | 7/2007 | Eren et al. |
| 2007/0156659 A1 | 7/2007 | Lim |
| 2007/0183000 A1* | 8/2007 | Eisen .................. H04N 1/00864 358/452 |
| 2007/0226014 A1 | 9/2007 | Alemayehu et al. |
| 2007/0254676 A1 | 11/2007 | Pedigo et al. |
| 2007/0275735 A1 | 11/2007 | Estevez |
| 2008/0002911 A1* | 1/2008 | Eisen .................. G06F 21/6245 382/283 |
| 2008/0011850 A1 | 1/2008 | Henry |
| 2008/0027949 A1* | 1/2008 | Kawada ............... G06F 21/6209 |
| 2008/0041942 A1 | 2/2008 | Aissa |
| 2008/0109099 A1 | 5/2008 | Moshier |
| 2008/0143482 A1 | 6/2008 | Shoarinejad et al. |
| 2008/0148059 A1 | 6/2008 | Shapiro |
| 2008/0168062 A1* | 7/2008 | Reeves ............... G07C 9/00087 |
| 2008/0239365 A1* | 10/2008 | Salgado et al. ............. 358/1.15 |
| 2008/0272881 A1 | 11/2008 | Goel |
| 2008/0307503 A1 | 12/2008 | Waters |
| 2009/0085745 A1 | 4/2009 | Gupta et al. |
| 2009/0089206 A1* | 4/2009 | Lukac .................. G06Q 40/025 705/38 |
| 2009/0121897 A1 | 5/2009 | Muhlethaler et al. |
| 2009/0144619 A1* | 6/2009 | Best ..................... G06F 21/6245 715/277 |
| 2009/0150442 A1 | 6/2009 | Barnard et al. |
| 2009/0167492 A1* | 7/2009 | Madafferi ........... G07C 9/00158 340/5.82 |
| 2009/0282492 A1* | 11/2009 | Takahashi .......... G06F 21/6218 726/27 |
| 2009/0289443 A1 | 11/2009 | Okezie |
| 2009/0296166 A1* | 12/2009 | Schrichte ......................... 358/474 |
| 2009/0321517 A1 | 12/2009 | Deane et al. |
| 2010/0033753 A1* | 2/2010 | Stephenson ........... G06F 3/0486 358/1.15 |
| 2010/0046015 A1* | 2/2010 | Whittle et al. ................. 358/1.9 |
| 2010/0070396 A1* | 3/2010 | Schrichte ........................ 705/34 |
| 2010/0123003 A1 | 5/2010 | Olson et al. |
| 2010/0241844 A1* | 9/2010 | Hussain et al. ............... 713/150 |
| 2011/0001604 A1 | 1/2011 | Ludlow et al. |
| 2011/0142295 A1 | 6/2011 | Mandelbaum et al. |
| 2011/0145053 A1* | 6/2011 | Hashim-Waris ................ G06Q 30/0235 705/14.35 |
| 2011/0221565 A1 | 9/2011 | Ludlow et al. |
| 2011/0238668 A1* | 9/2011 | Matsumoto ............ G06F 16/93 707/741 |
| 2012/0024948 A1 | 2/2012 | Messina |
| 2012/0117045 A1 | 5/2012 | Carlock |
| 2012/0330838 A1 | 12/2012 | Hoffman et al. |
| 2013/0024239 A1 | 1/2013 | Baker et al. |
| 2013/0040657 A1* | 2/2013 | Jackson ................... G06F 21/84 455/456.1 |
| 2013/0159021 A1* | 6/2013 | Felsher ................... G06F 19/328 705/3 |
| 2013/0185240 A1* | 7/2013 | Ward et al. ..................... 706/47 |
| 2013/0214044 A1 | 8/2013 | Sperduti et al. |
| 2013/0291126 A1* | 10/2013 | Thomson ............... G06F 16/94 726/30 |
| 2014/0056486 A1 | 2/2014 | Mandelbaum et al. |
| 2014/0059188 A1 | 2/2014 | Linden et al. |
| 2014/0115710 A1 | 4/2014 | Hughes et al. |
| 2015/0012305 A1* | 1/2015 | Truskovsky ......... G06Q 20/322 705/5 |
| 2015/0200922 A1* | 7/2015 | Eschbach ................. H04L 63/08 358/1.14 |
| 2016/0125680 A1* | 5/2016 | White .................. G07C 9/00103 235/380 |

(56) References Cited

U.S. PATENT DOCUMENTS

| | | |
|---|---|---|
| 2016/0358171 A1 | 12/2016 | Gannon |
| 2017/0126784 A1 | 5/2017 | Mattern |
| 2018/0096201 A1* | 4/2018 | Bermundo .......... G06K 9/00456 |
| 2018/0117945 A1* | 5/2018 | Talwerdi ................ G06Q 10/10 |

FOREIGN PATENT DOCUMENTS

| | | |
|---|---|---|
| DE | 4410459 A1 | 2/1995 |
| DE | 19527737 | 6/2006 |
| EP | 0187448 A2 | 7/1986 |
| EP | 0407207 A3 | 7/1991 |
| EP | 0683471 A1 | 11/1995 |
| EP | 0991027 A2 | 4/2000 |
| FR | 2571873 A1 | 4/1986 |
| GB | 1546053 | 1/1978 |
| GB | 2067322 | 10/1984 |
| GB | 2136180 B | 2/1985 |
| GB | 2270586 A | 3/1994 |
| GB | 2332973 A | 7/1999 |
| GB | 2359172 B | 2/2004 |
| JP | 0050075879 | 6/1975 |
| JP | 63138462 | 6/1988 |
| JP | 64055695 | 3/1989 |
| JP | 7093648 | 4/1995 |
| JP | 0080101868 | 4/1996 |
| JP | 09245231 | 9/1997 |
| JP | 11316818 | 11/1999 |
| JP | 3100972 B2 | 10/2000 |
| JP | 2003157615 A | 5/2003 |
| WO | WO8702491 A1 | 4/1987 |
| WO | WO9412372 | 6/1994 |
| WO | WO9422371 A2 | 10/1994 |
| WO | 0213049 A1 | 2/2002 |
| WO | WO02095589 A1 | 11/2002 |

OTHER PUBLICATIONS

*Honeywell International Inc. v. Intellicheck Mobilisa, Inc*, PTAB-CBM2017-00062, CBM review of patent owned by common assignee, initiated Jul. 28, 2017, documents filed Jul. 28, 2017.

*Honeywell International Inc. v. Intellicheck Mobilisa, Inc*, PTAB-CBM2017-00062, CBM review of patent owned by common assignee, initiated Jul. 28, 2017, documents filed Aug. 14, 2017 through Aug. 31, 2017.

*Honeywell International Inc. v. Intellicheck Mobilisa, Inc*, PTAB-CBM2017-00062, CBM review of patent owned by common assignee, initiated Jul. 28, 2017, documents filed Oct. 18, 2018.

*Honeywell International Inc. v. Intellicheck Mobilisa, Inc*, PTAB-CBM2017-00062, CBM review of patent owned by common assignee, initiated Jul. 28, 2017, documents filed Oct. 27, 2017.

*Honeywell International Inc. v. Intellicheck Mobilisa, Inc*, PTAB-CBM2017-00062, CBM review of patent owned by aommon assignee, initiated Jul. 28, 2017, documents filed Oct. 30, 2017.

Kim et al. 'Experiences with Tripwire: Using Integrity Checkers for Intrusion Detection', In Systems Administration. Networking and Security Conference III (Usenix, 1994 [online]). Published Feb. 21, 1994. [retrieved on Dec. 18, 2008]. Retrieved from the Internet.

*Honeywell International Inc. v. Intellicheck Mobilisa, Inc*, PTAB-CBM2017-00062, CBM review of patent owned by common assignee, initiated Jul. 28, 2017, documents filed Oct. 30, 2017.

\* cited by examiner

IDENTIFICATION SCAN IN COMPLIANCE WITH JURISDICTIONAL OR OTHER RULES

BACKGROUND

Identity verification is critical for various transactions or activities, such as transactions of age-restricted merchandise or access control activities for certain restricted areas. In a traditional fashion, a sales clerk or gate keeper can manually check an identification document of an individual who is involved in a transaction or wants to have access to a restricted area. Unfortunately, manual verification can be a time-consuming process and can be subject to inaccuracies due to human errors.

One way to overcome the problems with manual identification checks is to utilize an automatic scanning system that can quickly scan and accurately verify an identification document. However, various jurisdictions have different rules and regulations regarding the scanning of identification documents and the retention of information gained from the scans. For example, some jurisdictions may prohibit retention or dissemination of information retrieved from identification documents by electronic scans, while other jurisdictions may allow the same. For entities having activities in multiple jurisdictions, it is cumbersome and difficult to comply with all applicable rules and regulations in all jurisdictions where they operate. In addition, not every individual or business entity is capable of keeping track of related rules (not to mention corresponding updates) in various jurisdictions. As a result, many companies err on the side of caution and do not use or store much of the information that can be obtained from an identification document. Alternatively, some companies may manually enter information that is read from a document, which is prone to errors, rather than rely on a scan. Both solutions are sub-optimal from the standpoint of the business operator.

DETAILED DESCRIPTION

Figure 1:
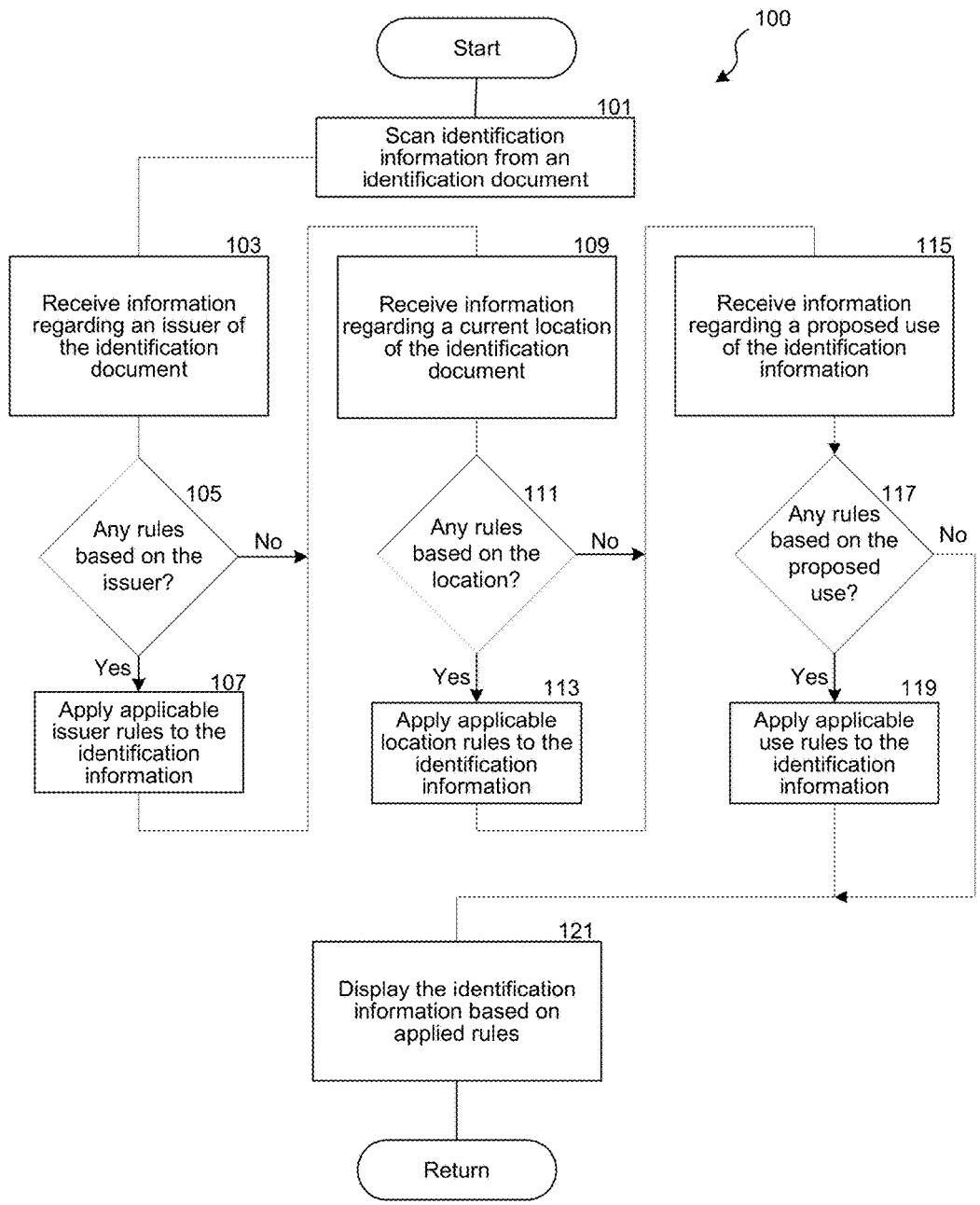
FIG. 1 is a flowchart illustrating a method implemented by an identification scanning system for retrieving identification information from an identification document and sequentially applying applicable rules to the retrieved information.

Identity verification plays an important role in transactions, activities, or interactions among parties who are not familiar with one another. To make sure that an individual standing in front of you is "authentic" or "the right person" to deal with, identification documents (e.g., a driver license, an identification card, a passport, or other suitable documents containing sufficient information to help verify the identity of an individual) are frequently used to verify the holders' identifies. Systems that can automatically read identification documents are increasingly used by businesses, governments, or individuals because they provide a fast, convenient and accurate solution for identity verification. Due to the increasing use of identity document scans and privacy concerns over the use of information obtained from those scans, however, more and more jurisdictions (e.g., countries, states, provinces, counties, cities, or other suitable administrative districts) have specific rules to regulate conduct involving collecting identification information via electronic scans of identification documents. Therefore, simply using an automatic identity verification system runs the risk of violating such rules in various jurisdictions.

The present system and method provide a convenient way to automatically verify identity of an identification document holder while maintaining compliance with applicable electronic scanning rules of various jurisdictions. More particularly, the present system and method enable scanning, processing, and utilizing (by, for example, presenting and/or storing) identification information derived from identification documents in a rule-compliant fashion. The scanning process includes a manual or automatic process of capturing any suitable information (including but not limited to images, embedded information, coded information, layout information, etc.) by a suitable scanning device. The system utilizes a database that contains relevant rules and regulations from various jurisdictions. The database can be centralized (e.g., a network-accessible database having all relevant rules) or decentralized (e.g., databases having relevant rules stored in various devices). In some embodiments, the system can retrieve (e.g., by a scanning device) identification information from an identification document and then receive applicable rules (of various jurisdictions) from the database. In other embodiments, the system can first receive applicable rules from the database and then retrieve identification information from an identification document.

Applicable rules can be determined or identified based on various factors. The factors include, for example, an issuer of the identification document, a current location where the identification document is being read, and a proposed use of the information contained in the identification document by an operator of a document scanner. The issuer of an identification document can be a state government, a federal government, a national or local agency (e.g., a military service, a government agency), a corporation, or other suitable entity. The issuer can have its own rules or regulations associated with how the information may be used from the identification documents issued by it. For example, Jurisdiction A may prohibit transmission of identification information retrieved from any Jurisdiction A driver licenses to a third party. The current location of the identification document when it is being scanned can be another factor. Various jurisdictions have rules on electronic scans of identification documents that happen within their territories. For example, Jurisdiction B can prohibit a seller from recording or maintaining certain sensitive information (e.g., name and address) derived from electronic scans of identification documents. Proposed uses of the scanned information by the operator of the document scanner can be another factor to consider. For example, Jurisdiction C may expressly prohibit the storage and use of identification information derived from electronic scans of identification documents for mailing list purposes.

After identifying applicable rules, the present technology can process the retrieved identification information based on the applicable rules. The "processing" of scanned identification information includes applying use restrictions specified by the applicable rules to the identification information, such as redacting, masking, removing, not storing, not transmitting, using only for limited purposes, etc. some of the retrieved identification information. For example, the system can delete, hide, mask, obscure, or edit the retrieved identification information, so as to make sure that an operator of the system (e.g., a sales clerk scanning a customer's identification document for a loyalty program) is in compliance with the applicable rules. The system can further present the processed identification information to a user via a user interface (e.g., on a display). In some embodiments, the system can present an indication showing that the identification information has been processed and is being presented in compliance with the applicable rules. In some embodiments, the system can maintain a record of how the identification information has been processed and utilized for purposes of a subsequent audit to show that the system has been compliant with the applicable rules. The system disclosed herein can be implemented by a suitable software product or various types of applications.

The system includes an input device (e.g., an identification scanner) configured to receive identification information. The system includes a processing module configured to process the received identification information based on multiple rules. As noted previously, the rules can be determined or identified at least based on an issuer of the identification document (e.g., a driver license issued by Jurisdiction A), a current location of the identification document (e.g., a used-car dealer's office in Jurisdiction B), and a proposed use of information from the identification document (e.g., to verify the identity of a potential used-car buyer for an application for a loan). In some embodiments, the rules can be predetermined and stored in the system before the system retrieves the identification information. In other embodiments, the rules can be determined after the system retrieves the identification information. For example, the system can identify the issuer of the identification document after retrieving the identification information, and the system can communicate with a database that stores relevant rules in various jurisdictions via a network. The system disclosed herein can be implemented in a dedicated scanning device, in a multi-purposes portable device (e.g., a smartphone, a notebook, a tablet, a phablet), or in other suitable devices, either fixed or mobile.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a flowchart illustrating a method 100 implemented by an identification scanning system for displaying information derived from an identification document to a user of the identification scanning system. At block 101, the system retrieves identification information from an identification document associated with an individual. In some embodiments, the identification document can be a local government issued identification document (e.g., a driver's license, a state ID), a federal government issued identification document (e.g., a passport, a military identification), a non-government-issued identification document (e.g., a corporate ID, a school ID), or other suitable identification documents. In some embodiments, the identification information can be retrieved by a scanning device. The identification information is encapsulated, embedded, or reflected in an identification document by visible text, barcodes, magnetic stripes, embedded data chips, etc. that are printed on, attached to, or contained in the identification document. The scanning device retrieves the identification information via image capture and optical character recognition (OCR), barcode reader, magnetic stripe reader, NFC chip reader, or other complementary technology. Additional details about techniques for scanning identification documents are described in commonly-owned U.S. Pat. No. 5,864,623, filed on Jul. 15, 1996 and entitled, "AUTHENTICATION SYSTEM FOR DRIVERS LICENSES" and U.S. Pat. No. 8,322,605, filed on Aug. 22, 2007 and entitled, "DYNAMIC IDENTITY MATCHING IN RESPONSE TO THREAT LEVELS," which are incorporated by reference herein in their entirety. At block 103, the system receives information regarding an issuer of the identification document. For example, the system can identify that the scanned identification document is a document issued by Jurisdiction A based on embedded information readable/accessible through a scan of a barcode, a magnetic stripe, a read of an embedded data chip, or an analysis of the layout of the identification document. More particularly, for example, the system can recognize that the scanned identification document is a Jurisdiction-A ID by comparing the layout or format of the scanned identification document with an ID database that stores layout or format information of ID cards issued by various jurisdictions. In another example, the system can recognize textual content (e.g., a description of "JURISDICTION A—DRIVER LICENSE") located at a specific portion (e.g., the upper portion) of the scanned identification document and learn the issuer information. In other embodiments, the system can identify the issuer information by retrieving or reading information that is coded or embedded in the scanned identification document. In some embodiments, the issuer information can also be received from a user input. That is, a user of the system may manually enter information into the system which characterizes the issuer of identification document that is being scanned.

At decision block 105, the system determines whether there exist any applicable rules based on the issuer. For example, Jurisdiction A may have specific rules regarding retention and use of data derived from any identification cards issued by it. In some embodiments, relevant rules are maintained and stored in a centralized database, and the system can access the centralized database system via a wired or wireless network. In some embodiments, the relevant rules can be stored in a local scanning device or at a local computing system at a point of sale.

In an event that one or more applicable issuer rules are identified, the system continues at block 107 to apply the identified rules to the retrieved identification information. For example, Jurisdiction A may prohibit use of gender and age information derived from Jurisdiction-A-issued identification cards by electronic scans. In this example, the system can apply Jurisdiction A's rule by processing the retrieved identification information to delete the gender and age information retrieved from a Jurisdiction-A-issued identification card. In an event that no applicable rule has been identified, processing proceeds to block 109 directly.

At block 109, the system receives a current location of the identification document. The current location can be generated, determined, or identified from various sources. The current location of the identification document being scanned can be determined using one or more methods, including: (1) accessing a database that contains the location where the system implementing the method 100 is installed (e.g., a record shows that a relevant software product was installed in a computing device located in a city such as Moab, Utah); (2) accessing a database containing a location of a physical building containing the point of sale (e.g., the current scanning operation occurs at a store located in Jurisdiction B); (3) using a service that converts a (network) virtual address to a physical location (e.g., a service shows that an Internet Protocol (IP) address of a computing device utilized in the scanning operation has a physical location in Jurisdiction B); or (4) using a global positioning system (GPS) or other similar location-determining technology to determine the current location of the scanning device (e.g., a GPS shows that a computing device utilized in the scanning operation is located in Jurisdiction B). In some embodiments, the current location can be determined using one method and then can be further verified by another method.

After the location information is received, the system proceeds to decision block 111 to determine whether there exist any applicable rules based on the location. For example, Jurisdiction B may have specific rules regarding electronic scans of identification documents within its jurisdiction. Examples of specific rules include: (1) a prohibition of retention of any scanned data after use, (2) a prohibition of dissemination of scanned data to third parties, (3) a prohibition of using the scanned data for more than one purpose (e.g., using the scanned customer information for the purpose of age-restricted purchase and adding to a mailing list, (4) restrictions on the types of information that can be collected (e.g., a date of birth, an identification number, an expiration date, a name, or an address), and (5) a prohibition of storing certain types of information (e.g., a photograph, a social security number, a height, a weight, a race, or a signature).

In an event that one or more applicable rules based on location are identified at block 111, the system continues at block 113 to apply the identified rules to the retrieved identification information. For example, if Jurisdiction B prohibits retention of age information from electronic scans of any identification documents, the system can apply this rule by processing the retrieved identification information to delete the age information retrieved from an identification card issued by any jurisdiction. In an event that no applicable rule has been identified at block 111, processing proceeds to block 115 directly.

At block 115, the system receives a proposed use of the identification document. The proposed use can be based on a predetermined system setting. For example, a system installed at a point of sale may be configured so that the proposed use of scanned information is for purposes of consummating a sale. As another example, a system at a car dealership may be configured so that the proposed use of the scanned information is to prevent fraud in loan applications. In some embodiments, the proposed use is received from a user input. For example, a cashier may indicate that the scanned information is to be used for purposes of signing up for a loyalty program. After the proposed use is determined, processing proceeds to decision block 117 where the system determines whether there exist any applicable rules based on the proposed use. For example, Jurisdiction C may only allow information electronically scanned from identification documents to be stored or shared for specific purposes (e.g., product returns, account collection activities, establishing contractual relationships, credit card applications, credit verification, identity verification, fraud prevention, criminal conduct prevention, advancing law enforcement, etc.) but prohibited for other activities (e.g., activities relating to general marketing or customer loyalty programs). In an event that no applicable rule has been identified at block 117, processing proceeds to block 121 directly.

In an event that one or more applicable rules are identified, at block 119 the system applies the identified rules to the retrieved identification information. For example, if Jurisdiction C only allows use of electronically-scanned gender and age information for law enforcement purposes, the system can apply this rule by processing the retrieved identification information to delete the gender and age information retrieved from an identification card if the proposed use is not for law enforcement.

At block 121, the system displays the processed identification information based on the applied rules. In some embodiments, the system presents the processed identification information to an operator or a user of the system (e.g., a sales clerk, a gate keeper, a used-car dealer, a loan officer, a police officer, or other suitable individual). The information may be presented on a computing device display or in a printout of a form or other document, stored for subsequent reference, and/or transmitted to other computing systems for additional processing. In some embodiments, the processed identification information is a redacted version of the identification information. In other words, some identification information is stripped out and not presented to the user. The system ensures that the electronic scans of identification documents are in compliance with the identified applicable rules. In some embodiments, the system can present the processed identification information along with an indication showing the reasons why the identification information has been redacted or restricted in some fashion (e.g., a description of "State Law Prohibits Electronic Scan of Age for Marketing").

In some embodiments, the system generates and maintains a record regarding the scanned identification documents and resulting use of the scanned information for purposes of future review and audit. By providing an audit trail associated with a scanned document, the system enables system users to provide evidence to appropriate authorities that demonstrate compliance with applicable rules. It will be appreciated that in the illustrated embodiment of FIG. 1, the sequence of receiving the information of the issuer, the current location, and the proposed use (and identifying/applying applicable rules) can be varied. For example, receiving the proposed use and identifying/applying applicable rules can be performed before receiving the issuer and the current location, depending on various designs.

Figure 2:
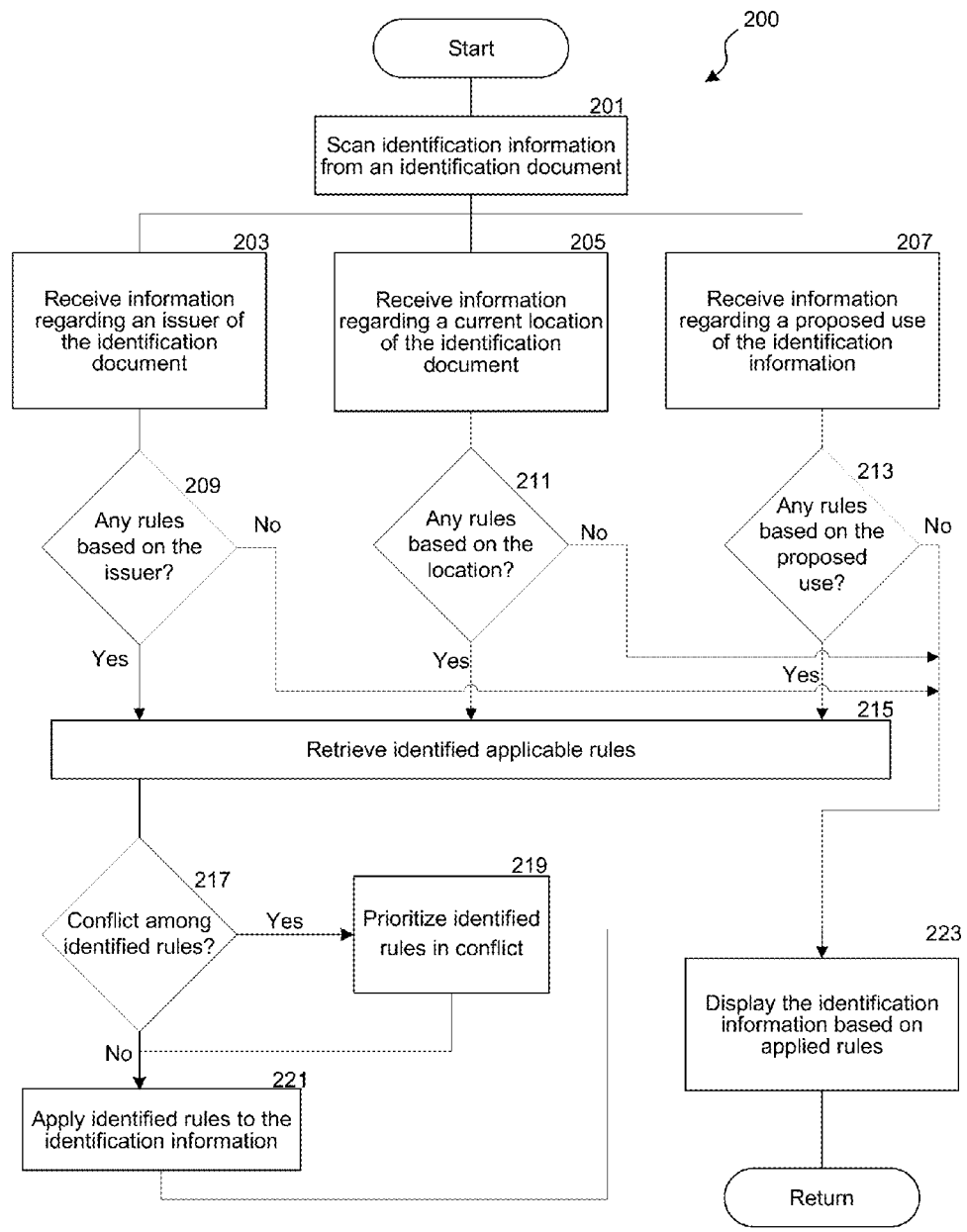
FIG. 2 is a flowchart illustrating a method implemented by an identification scanning system for retrieving identification information from an identification document and applying applicable rules in parallel to the retrieved information.

FIG. 2 is a flowchart illustrating a method 200 implemented by an identification scanning system for displaying information derived from an identification document. The system starts at block 201 to retrieve identification information from an identification document associated with an individual. In some embodiments, the identification information can be retrieved by a scanning device, as discussed above. The system also receives information regarding an issuer of the identification document, a current location of the identification document, and a proposed use of the information from the identification document in parallel at blocks 203, 205, and 207. In a similar fashion to the operation of the system discussed above in connection with FIG. 1, the issuer of the identification document can be received from a user input. The current location can be generated, determined, or identified from various sources. And the proposed use can be based on a predetermined setting or received from a user input.

After receiving the information regarding the issuer, the current location, and the proposed use of the identification document, the system determines whether there are any applicable rules based on the received information in parallel at decision blocks 209, 211, and 213. In an event that no applicable rule has been identified, processing proceeds to block 223 directly. In an event that one or more applicable rules are identified at decision blocks 209, 211, and 213, the system continues at block 215 to retrieve the identified applicable rules (e.g., from a local database or a centralized database, as discussed above). After retrieving the applicable rules, processing proceeds to decision block 217 to determine whether there is any conflict among the identified applicable rules. For example, conflicts may arise between a federal rule and a state rule. If there is a conflict, the system continues to block 219 to prioritize the identified applicable rules in conflict. For example, a federal rule may prevail when it conflicts with a state rule, and therefore a high priority is assigned to the federal rule while a low priority is assigned to the state rule. As another example, if two rules conflict, the system may selectively apply the most restrictive aspects of each of the rules to ensure that the system abides by the minimum requirements of both rules. For example, if one rule indicates that information can be used for marketing purposes but not for loyalty purposes, and another rule indicates that the information can be used for loyalty purposes but not marketing purposes, the system may bar the use of scanned information for either marketing purposes or for loyalty purposes. By applying the most conservative interpretation, the system helps ensure that all applicable rules are being met. If there is no conflict among the identified rules, processing proceeds to block 221 directly.

Processing continues to block 221 to apply identified rules to the identification information. If there is a conflict of rules, then the rules are applied based on the priorities thereof. For example, when a rule with high priority conflicts with a rule with low priority, the rule with high priority is applied and the rule with low priority is ignored. As discussed above, applying the applicable rules can include processing (e.g., delete, hide, mask, obscure, or edit) the identification information. In some embodiments, an operator of the system can modify the rules manually (e.g., override an identified rule). In such case, the system can provide a warning to the operator so as to inform the operator that a manual modification may result in a violation of the identified rule.

At block 223, the system presents the processed identification information based on the applied rules (e.g., it is presented to an operator of the system or stored for a future use such as a royalty program). In some embodiments, the presented identification information can be a stripped version of the identification information. The system can make sure that the whole process (e.g., including electronic scans of identification documents and further uses of the retrieved information) involving identification documents from various jurisdictions is in compliance with identified applicable rules. In some embodiments, the system can present the processed identification information along with an indication showing the reasons why the identification information needs to be processed. In some embodiments, the system can generate and maintain a record regarding the whole process involving electronic scans of identification documents for purposes of a subsequent audit to show that the system has been compliant with the applicable rules.

Figure 3:
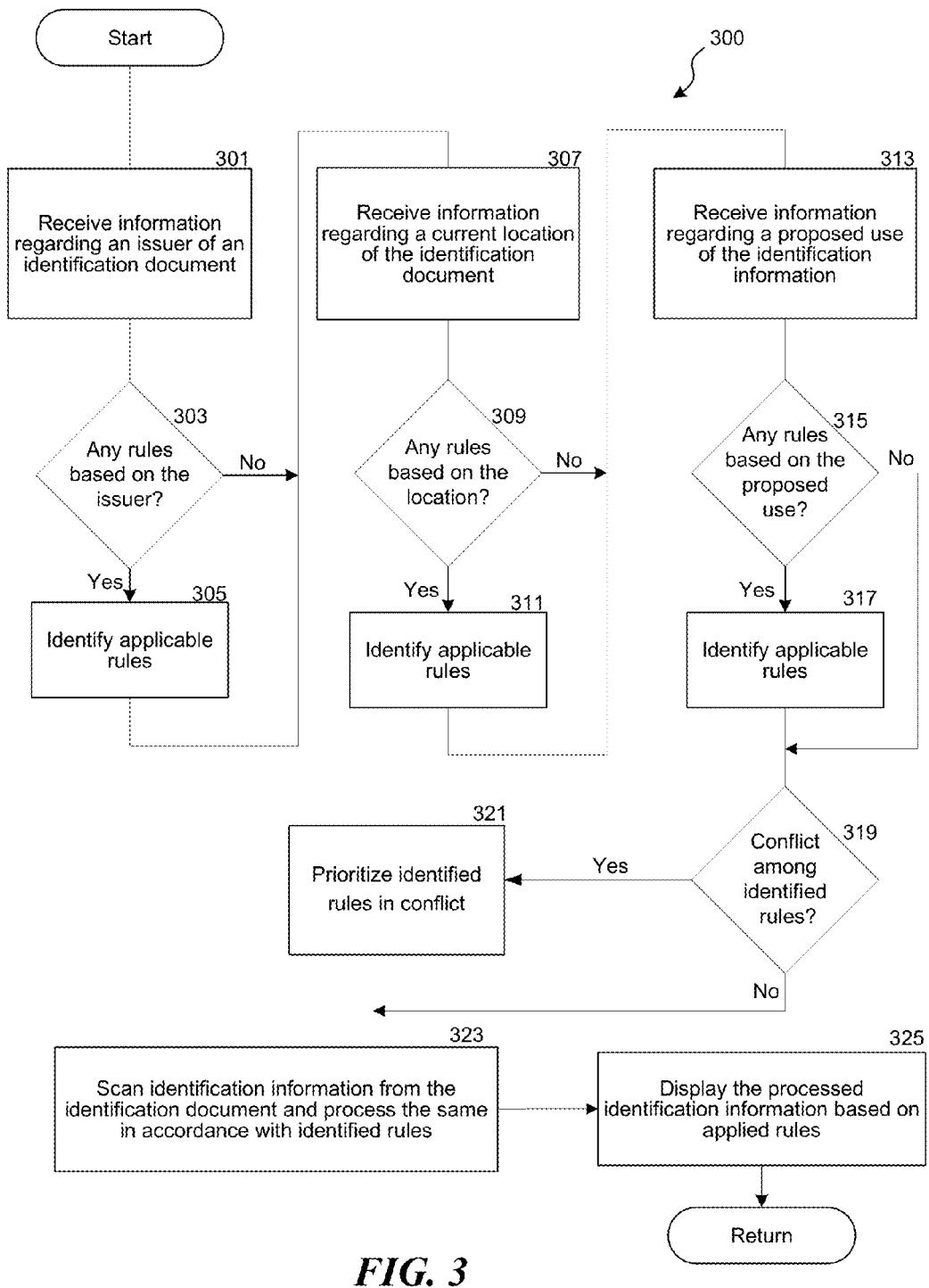
FIG. 3 is a flowchart illustrating a method implemented by an identification scanning system for identifying applicable rules to retrieve information from an identification document and then retrieving the information in accordance with the rules.

FIG. 3 is a flowchart illustrating a method 300 implemented by an identification scanning system for displaying information derived from an identification document. At block 301, the system receives information regarding an issuer of the identification document. In some embodiments, the issuer of the identification document can be retrieved by a scanning device. In some embodiments, the issuer of the identification document can be received from a user input. Processing continues at decision block 303 to determine whether there exist any applicable rules based on the issuer of the identification document. In some embodiments, relevant rules from various jurisdictions are maintained and stored in a centralized database, and the system can access to the centralized database system via a wired or wireless network. In some embodiments, the relevant rules are stored in a local scanning device or at a local computing system at a point of sale, visitor center or restricted area. In an event that one or more applicable rules are identified, the rules are "remembered" or stored. Processing then continues at block 307.

At block 307, the system receives information regarding a current location of the identification document. The current location can be generated from various sources, as discussed above. After the current location is received, processing proceeds to decision block 309 to determine whether there exist any applicable rules based on the second set of information. In an event that one or more applicable rules are identified at decision block 309, the rules are "remembered" or stored. The system continues at block 313.

At block 313, the system receives information regarding a proposed use of the identification document. The proposed use can be received from a predetermined setting or a user input. After the proposed use is received, processing proceeds to decision block 315 to determine whether there exist any applicable rules on the proposed use based on the issuer and/or location. In an event that one or more applicable rules are identified, the rules are "remembered." The system then continues at block 319.

At decision block 319, the system determines whether there is any conflict among identified "remembered" applicable rules (e.g., a federal rule may conflict with a state rule for certain types of conduct). If there is no conflict among the identified rules, processing proceeds to block 323 directly. If there is a conflict among identified rules, processing proceeds to block 321 to prioritize the identified rules in conflict. The system continues to block 323 to retrieve identification information from the identification document in accordance with the "remembered" applicable rules. For example, Jurisdiction A may prohibit retrieving address information by electronic scanning an identification document for any purposes. In this case, the system would not retrieve the address information from the identification document (e.g., the system can identify the field of "Address" and skip it in the process of information retrieval).

At block 325, the system displays the processed identification information to an operator. In some embodiments, the processed identification information can be presented as a stripped or "sanitized" version of the identification information. The system can make sure that the whole process involving identification documents from various jurisdictions is in compliance with applicable rules. In some embodiments, the system can present the processed identification information along with an indication showing the reasons why the identification information needs to be processed. In some embodiments, the system can generate and maintain a record regarding the whole process involving electronic scans of identification documents for purposes of future review and audit (e.g., as evidence for compliance of applicable rules). In some embodiments, the system can generate a statement stating that the use of the information scanned by the system has remained compliant with the applicable rules. The statement can be used to let an identification document holder (e.g., a customer at a store) know that the identification scan performed by the system is compliant with the applicable rules.

Figure 4:
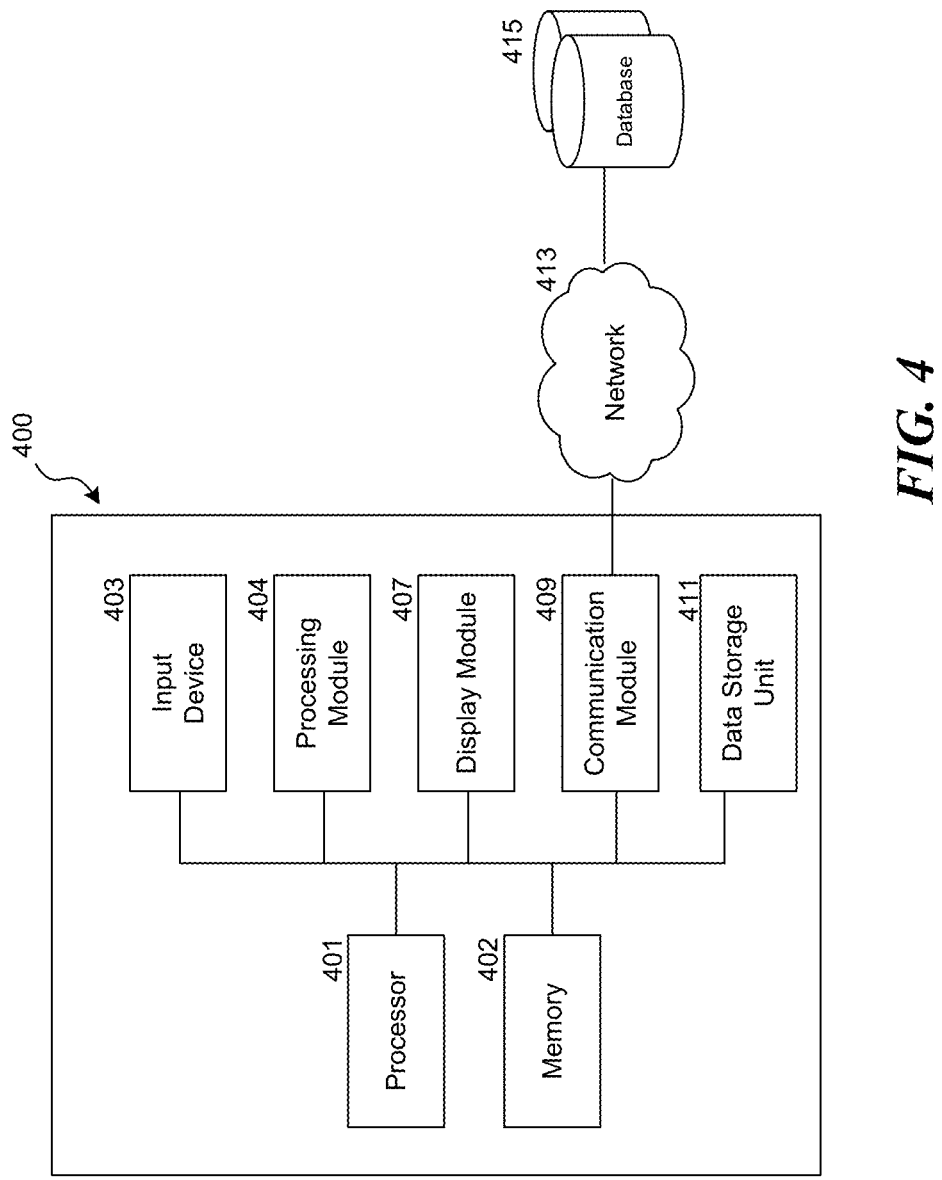
FIG. 4 is a schematic diagram illustrating a system for performing identification scans in compliance with jurisdictional or other rules.

FIG. 4 is a schematic diagram illustrating a system 400. As shown in FIG. 4, the system 400 can include a processor 401, a memory 402, an input device 403, a processing module 405, a display module 407, a communication module 409, and a data storage unit 411. In some embodiments, the system 400 can be a portable device (e.g., a smartphone, a notebook, a tablet, a phablet, or other suitable devices). The system 400 can communicate with an external database 411 via a network 413. In some embodiments, the network 413 can include the Internet, a corporate intranet, a wireless network, or other suitable networks. In the illustrated embodiments, the database 415 can store multiple electronic scanning rules or regulations from various jurisdictions. In some embodiments, the database 415 can be a distributed database. The processor 401 is coupled to other components and configured to control the same. The memory 402 is configured to temporarily (or non-transitorily) store data or instructions processed by the processor 401.

In the illustrated embodiment, the input device 403 can receive a user input (e.g., the issuer, the current location, and the proposed use for identifying applicable rules as discussed above). In some embodiments, the input device 403 can be a scanning device for retrieving identification information from an identification document associated with an individual. In some embodiments, the input device 403 can be configured to have embedded information regarding a location or a proposed use. For example, the input device 403 can be designed or programed to use only in a certain jurisdiction (e.g., a store located in Jurisdiction A). As another example, the input device 403 can be designed or programed for a specific purpose, such as a customer royalty program. The embedded information can be used to determine one of the factors (e.g., the "location" factor and the "proposed use" factor discussed above) that are used to identify applicable rules in various jurisdictions. The processing module 405 is configured to process the retrieved identification information based on identified applicable rules (e.g., these rules can be identified at and received from the database 415 based on predetermined criteria such as the issuer, the current location, and the proposed use). In some embodiments, the processing module 405 can delete, hide, mask, obscure, or edit the retrieved identification information based on multiple identified applicable rules. The display module 407 is configured to present the processed identification information to an operator or a user of the system 400 (e.g., a sales clerk uses the system 400 to scan a customer's identification document for identity verification). In some embodiments, the identified applicable rules can be stored in the data storage unit 411, such that the system 400 can have access to the identified applicable rules without accessing the network 413. This arrangement enables the system 400 to function normally without network connection. In some embodiments, the data storage unit 411 can be used to store the redacted or processed identification information for a future process. For example, the stored redacted identification information can be used for an analysis of consumer behavior, a consumer royalty program, a marketing activity, or other suitable processes.

Figure 5:
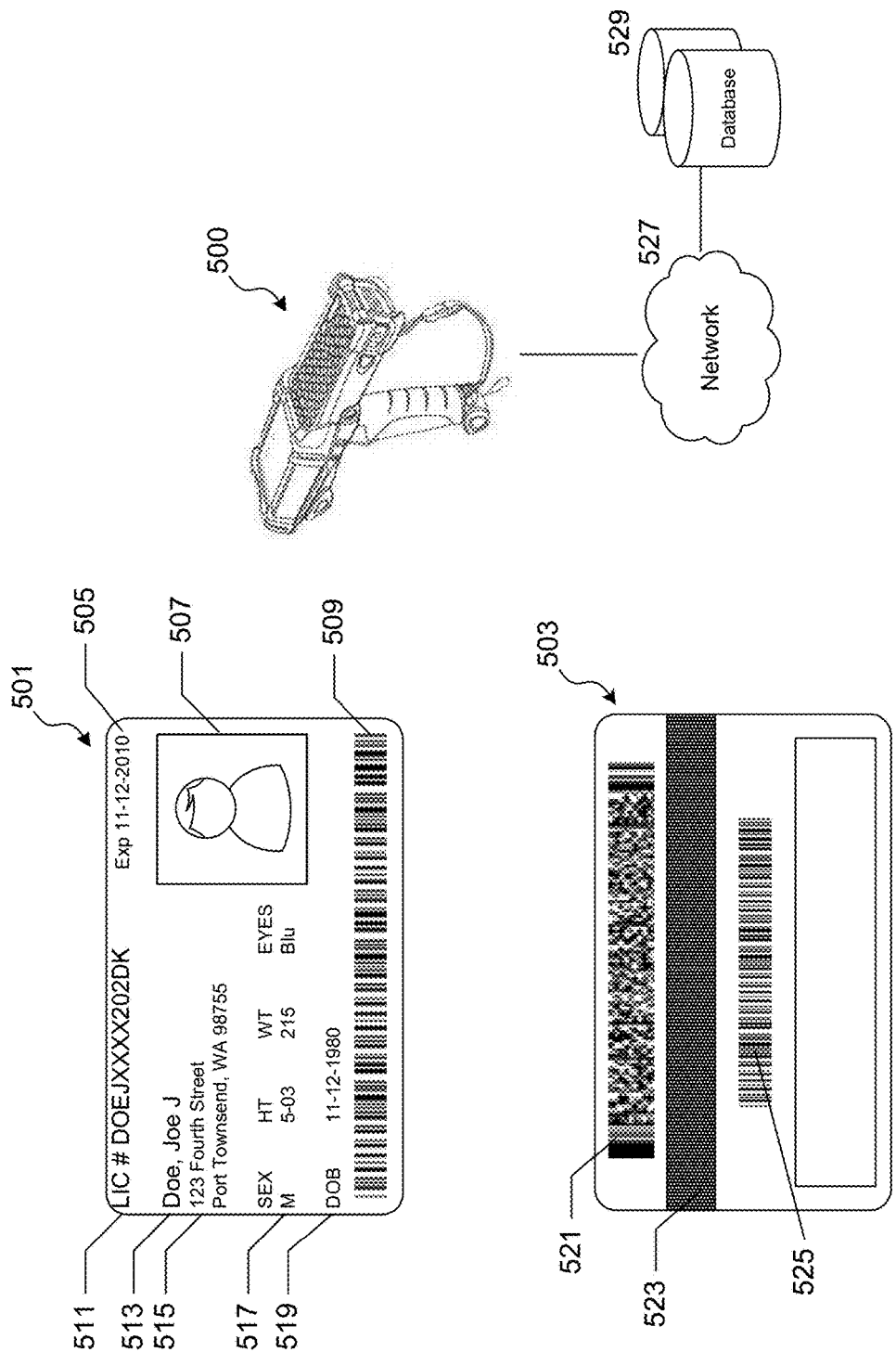
FIG. 5 is a schematic diagram illustrating a scanning device and an identification document.

FIG. 5 is a schematic diagram illustrating a scanning device 500 and an identification document. As shown in FIG. 5, the scanning device can be connected with a database 529 via a network 527. In some embodiments, the network 527 can include the Internet, a corporate intranet, a wireless network, or other suitable networks. In the illustrated embodiments, the database 529 can store multiple rules or regulations regarding electronic scans from various jurisdictions. In some embodiments, the database 529 can be a distributed database. The scanning device 500 is configured to receive identification information from an identification card, which includes a front side 501 and a back side 503. In the illustrated embodiment, the identification information can include an expiration date 505 of the identification card, a photograph 507, an identification number 511, a name 513, an address 515, a set of personal information 517 (including sex/gender, height, weight, and eye color), and a date of birth 519. The scanning device 500 can retrieve the identification information by scanning one-dimension barcodes 509 and 525, a two-dimensional barcode 521, a magnetic stripe 523 and/or an embedded data chip (not shown). In other embodiments, the scanning device 500 can retrieve the identification information by scanning other suitable types of data carriers. The scanning device 500 can identify or recognize the identification information retrieved from identification documents in various ways (e.g., based on embedded information readable/accessible through a scan or the layout of the scanned identification document).

Figure 6:
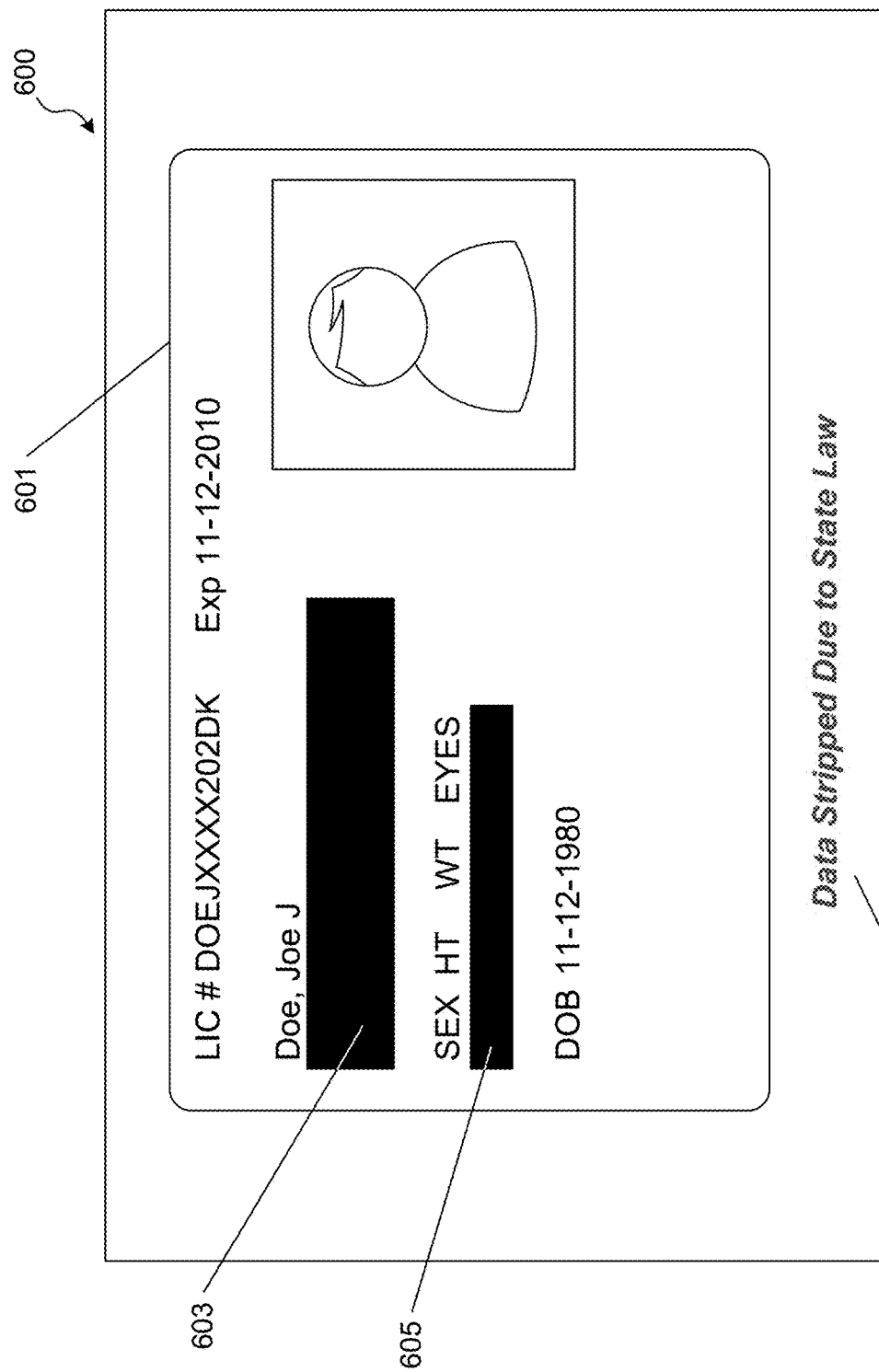
FIG. 6 is a schematic diagram illustrating a user interface for the system for performing identification scans in compliance with jurisdictional or other rules.

FIG. 6 is a schematic diagram illustrating a user interface for the system for performing identification scans in compliance with jurisdictional rules. As shown in FIG. 6, the user interface 600 presents a set of processed identification information (e.g., the processed identification information discussed in connection with FIGS. 1-4 above) in a display area 601. The display area 601 further includes a first stripped area 603 and a second stripped area 605. The first stripped area 603 indicates that address information (e.g., the address 615 shown in FIG. 6) cannot be presented to a user due to certain rules. Similarly, the second stripped area 605 indicates that personal information (e.g., the set of personal information 616 shown in FIG. 6) cannot be presented to a user due to certain rules. An indication 607 can be presented adjacent to the display area 601. In the illustrated embodiment, the indication 607 includes a description "Data Stripped Due to State Law," which explains the reason of the existence of the first stripped area 603 and the second stripped area 605. In some embodiments, the indication 607 can be removed from the interface 600. In some embodiments, the indication can include various forms including blinking signals, sounds, or other suitable indicators.

It will be appreciated by those skilled in the art that the components or modules that are part of the system or interact with the system may be implemented by computer-executable instructions, such as program modules, executed by one or more computers or other devices. Those skilled in the art will further appreciate that the system or aspects of the system disclosed herein may be implemented on any computing system or device. Suitable computing systems or devices include server computers, multiprocessor systems, microprocessor-based systems, network devices, minicomputers, mainframe computers, distributed computing environments that include any of the foregoing, and the like. Such computing systems or devices may include one or more processors that execute software instructions to perform the functions described herein. Processors include programmable general-purpose or special-purpose microprocessors, programmable controllers, application specific integrated circuits (ASICs), programmable logic devices (PLDs), or a combination of such devices. Software may be stored in a memory, such as a random access memory (RAM), a read-only memory (ROM), a flash memory, or a combination of such devices. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed as desired in various embodiments.

From the foregoing, it will be appreciated that specific embodiments of the invention have been described herein for purposes of illustration, but that various modifications may be made without deviating from the spirit and scope of the present disclosure. Accordingly, the present technology is not limited except as by the appended claims.

We claim:

1. A system communicably linked with a document scanner via a computer network, the system comprising:
   one or more non-transitory tangible computer readable media bearing one or more program instructions; and
   at least one computer processor configured by the one or more program instructions to execute operations including at least:
      retrieving encoded identification information obtained by scanning an identification document using the document scanner;
      analyzing the encoded identification information to identify an issuer of the identification document and to extract at least identification information;
      receiving a physical location of the document scanner and a proposed use of the identification document;
      determining at least one applicable use restriction rule based at least partly on the issuer of the identification document, the physical location of the document scanner, and the proposed use of the identification document, including at least:
         identifying with respect to the proposed use of the identification document at least one first use restriction rule based at least partly on the issuer and at least one second use restriction rule based at least partly on the physical location of the document scanner; and
         generating the at least one applicable use restriction rule by analyzing the at least one first use restriction rule identified based at least partly on the issuer and the at least one second use restriction rule identified based at least partly on the physical location of the document scanner, wherein generating the at least one applicable use restriction rule comprises generating the at least one applicable use restriction rule by applying one or more most restrictive aspects of the at least one first use restriction rule and the at least one second use restriction rule; and
      applying the at least one applicable use restriction rule to reduce at least some of the identification information to form redacted identification information and using the redacted identification information for the proposed use of the identification document.

2. The system of claim 1, wherein the physical location is determined based on (1) accessing a database that contains a location of the system; (2) using a service that converts a network address or virtual address to the physical location of the system; (3) a global positioning system (GPS) of the system; (4) a pre-configured reference to a location of the system; or (5) accessing configuration information that contains a location of the system.

3. The system of claim 1, wherein the proposed use of the identification document includes an age verification, an identity verification, a fraud prevention, a credit card application, a credit verification, a customer loyalty program registration, an association of a customer loyalty program with a point of sale transaction, a marketing activity, or physical access approval/denial.

4. The system of claim 1, wherein the issuer and the physical location are associated with a plurality of jurisdictions.

5. The system of claim 1, wherein the at least one first use restriction rule is associated with a first jurisdiction and the at least one second use restriction rule is associated with a second jurisdiction.

6. The system of claim 1, wherein the reducing of the at least some of the identification information includes stripping the at least some of the identification information.

7. The system of claim 1, further comprising:
   presenting an indication showing that the identification information is presented in compliance with the at least one applicable use restriction rule.

8. The system of claim 1, further comprising:
   storing the identification information based on the at least one applicable use restriction rule.

9. The system of claim 1, wherein the identification document includes one or more of a driver license, an identification card, or a passport.

10. The system of claim 1, wherein the encoded identification information is encapsulated or embedded within a barcode, a magnetic stripe, or a data chip.

11. The system of claim 1, wherein the identification information includes one or more of a name, an address, an expiration status of the identification document, a date of birth, an age, or a gender.

12. The system of claim 1, wherein the proposed use is determined based on a predetermined system setting or via user input.

13. The system method of claim 1, wherein the at least one applicable use restriction rule is predetermined and stored before the system retrieves the identification information.

14. The system of claim 1, wherein the document scanner is configured to retrieve the encoded identification information via at least one of image capture and optical character recognition (OCR), barcode reader, magnetic stripe reader, or NFC chip reader.

15. The system of claim 1, wherein the at least one computer processor is configured by the one or more program instructions to execute an operation comprising:
   generating a record regarding to show that the system has been compliant with the at least one applicable use restriction rule.

16. The system of claim 1, wherein the proposed use of the identification document includes at least one of addition of a user to a mailing list, product return, account collection activity, establishing contractual relationship, or advancing law enforcement.

17. The system of claim 1, wherein the at least one applicable use restriction rule is determined after the system retrieves the identification information.

18. The system of claim 1, wherein the system is implemented by a dedicated scanning device, a network and a fixed scanning device, or a multi-purpose portable device.

19. The system of claim 1, where the applying one or more most restrictive aspects of the at least one first use restriction rule and the at least one second use restriction rule ensures that the system abides by minimum requirements of both the at least one first use restriction rule and the at least one second use restriction rule.

20. The system of claim 1, wherein generating the at least one applicable use restriction rule comprises identifying a conflict between the at least one first use restriction rule and the at least one second use restriction rule and prioritizing one or more most restrictive aspects of the at least one first use restriction rule or the least one second use restriction rule.

21. A method for displaying identification information from an identification document associated with an individual using an identification scanning system having a document scanner and a memory, the method comprising:
   scanning, using the document scanner, an identification document in order to retrieve identification information from the identification document;
   analyzing the identification information to identify an issuer of the identification document;
   receiving information indicative of a current location of the document scanner;
   retrieving information indicative of a proposed use of the identification documentation;
   determining at least one applicable use restriction rule based at least partly on the issuer of the identification document, the current location of the document scanner, and the proposed use of the identification document, including at least:
      identifying with respect to the proposed use of the identification document at least one first use restriction rule based on the issuer and at least one second use restriction rule based on the current location of the document scanner; and
      generating the at least one applicable use restriction rule by analyzing the at least one first use restriction rule and the at least one second use restriction rule based at least partly on the proposed use of the identification document, wherein generating the at least one applicable use restriction rule comprises generating the at least one applicable use restriction rule by applying one or more most restrictive aspects of the at least one first use restriction rule and the at least one second use restriction rule; and
   applying the at least one applicable use restriction rule including at least removing some of the identification information to form redacted identification information; and
   displaying the redacted identification information.

22. The method of claim 21, wherein the issuer of the identification document includes a state government.

23. The method of claim 21, wherein the current location is determined based on a database that contains a location of the system; a pre-configured location of a point of sale; a location identifiable based on an Internet address; a pre-configured reference to a location of the system; or a location calculated by a global positioning system.

24. The method of claim 21, wherein the proposed use of the identification document includes an age verification, an identity verification, fraud prevention, a credit card application, a credit verification, a customer loyalty program registration, an association of a customer loyalty program with a point of sale transaction, a physical access approval/denial, or a marketing activity.

25. The method of claim 21, wherein the issuer and the current location are associated with a plurality of jurisdictions.

26. The method of claim 21, further comprising:
   storing the redacted identification information.

27. An identification scanning device for scanning identification information from an identification document associated with an individual, the identification scanning device comprising:
   a data storage unit;
   a display;
   a processor;
   a memory coupled to the processor and including one or more computer instructions that configure the processor to execute operations including at least:
      receiving the identification information obtained by scanning the identification document using the identification scanning device;
      analyzing the identification information to identify an issuer of the identification document;
      receiving a physical location of the identification scanning device and a proposed use for the identification document;
      determining at least one applicable use restriction rule based at least partly on the issuer of the identification document, the physical location of the identification scanning device, and the proposed use of the identification document, including at least:
         identifying with respect to the proposed use of the identification document at least one first use restriction rule based on the issuer and at least one second use restriction rule based on the physical location of the identification scanning device; and
         generating the at least one applicable use restriction rule by analyzing the at least one first use restriction rule and the at least one second use restriction rule, wherein generating the at least one applicable use restriction rule comprises generating the at least one applicable use restriction rule by applying one or more most restrictive aspects of the at least one first use restriction rule and the at least one second use restriction rule; and
      applying the at least one applicable use restriction rule to reduce at least some of the identification information to form redacted identification information and using the redacted identification information for the proposed use of the identification document.

28. The device of claim 27, wherein the physical location is determined based on a database that contains a location of the device; a pre-configured location of a point of sale; a location identifiable based on an Internet address; a pre-configured reference to a location of the device; configuration information that contains a location of the device; or a location calculated by a global positioning system.

29. The device of claim 27, wherein the proposed use of the identification document includes an age verification, an identity verification, fraud prevention, a credit card application, a credit verification, a customer loyalty program registration, an association of a customer loyalty program with a point of sale transaction, physical access approval/denial, or a marketing activity.

30. The device of claim 27, wherein the issuer and the physical location are associated with a plurality of jurisdictions.

31. The device of claim 27, wherein the processor is further configured to execute an operation comprising:
   generating a record of at least some of the identification information.

* * * * *